(12) United States Patent
Dequin et al.

(10) Patent No.: US 9,156,541 B2
(45) Date of Patent: Oct. 13, 2015

(54) METHOD OF DRIVING A MAIN ROTOR OF A ROTORCRAFT IN ROTATION IN COMPLIANCE WITH A SPEED OF ROTATION SETPOINT OF VARIABLE VALUE

(71) Applicant: EUROCOPTER, Marignane, Cedex (FR)

(72) Inventors: Andre-Michel Dequin, Puyricard (FR); Manousos Kelaidis, Marseilles (FR); Antoine Baud, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 258 days.

(21) Appl. No.: 14/140,673

(22) Filed: Dec. 26, 2013

(65) Prior Publication Data

US 2014/0229037 A1   Aug. 14, 2014

(30) Foreign Application Priority Data

Dec. 27, 2012   (FR) ...................................... 12 03607

(51) Int. Cl.
*G01C 23/00* (2006.01)
*G05D 1/00* (2006.01)
(Continued)

(52) U.S. Cl.
CPC ................. *B64C 19/00* (2013.01); *B64C 27/04* (2013.01); *B64C 27/32* (2013.01); *B64D 31/06* (2013.01)

(58) Field of Classification Search
CPC .. B64C 2025/325; B64C 31/06; B64C 27/12; B64C 27/04; B64C 27/32; B64C 11/06; B64C 11/44; B64C 27/006; B64C 27/14; B64D 2027/026; B64D 27/24; B64D 31/00; B64D 31/06; B64D 35/08; B64D 15/12; B64D 35/02

USPC ........................ 701/22, 3, 50, 100, 2; 60/773; 318/400.11, 400.01, 56, 599, 400.04, 318/798, 504, 717, 400.26, 400.06, 400.23
See application file for complete search history.

(56) References Cited

U.S. PATENT DOCUMENTS 3,105,659 A   10/1963  Stutz
3,174,284 A    3/1965  McCarthy
(Continued)

FOREIGN PATENT DOCUMENTS

EP       0398840      11/1990
EP       0601097      11/1995
(Continued)

OTHER PUBLICATIONS

French Search Report for FR 1203607, Completed by the French Patent Office on Jul. 9, 2013, 6 pages.
(Continued)

*Primary Examiner* — Calvin Cheung
*Assistant Examiner* — Luis A Martinez Borrero
(74) *Attorney, Agent, or Firm* — Brooks Kushman P.C.

(57) ABSTRACT

The present invention provides a method of driving a main rotor (2) of a rotorcraft (1) in rotation. A regulation setpoint (C) for a power plant (3) used for driving the main rotor (2) at a variable speed of rotation is generated by a control unit (4) and is transmitted to a regulator unit (5) for regulating the operation of the power plant (3). The value of an initial setpoint ($NR_{ini}$) is generated progressively and continuously depending on variation in the current value of the density (D) of the ambient air outside the rotorcraft (1). The value of the initial setpoint ($NR_{ini}$) is potentially corrected depending on predefined flight conditions of the rotorcraft (1). Prior to being transmitted to the regulator unit (5), the value of the regulation setpoint (C) is preferably limited to a range of acceptable speeds for driving the main rotor (2) in rotation.

20 Claims, 1 Drawing Sheet

(51) Int. Cl.
*G05D 3/00* (2006.01)
*G06F 7/00* (2006.01)
*G06F 17/00* (2006.01)
*B64C 19/00* (2006.01)
*B64D 31/06* (2006.01)
*B64C 27/04* (2006.01)
*B64C 27/32* (2006.01)

(56) References Cited

U.S. PATENT DOCUMENTS

| | | | |
|---|---|---|---|
| 4,466,526 | A | 8/1984 | Howlett et al. |
| 5,314,147 | A | 5/1994 | Ebert et al. |
| 6,099,254 | A * | 8/2000 | Blaas et al. ............ 416/114 |
| 6,198,991 | B1 | 3/2001 | Yamakawa et al. |
| 6,616,095 | B2 * | 9/2003 | Stamps et al. ............ 244/17.13 |
| 6,793,173 | B2 | 9/2004 | Salesse-Lavergne |
| 7,496,433 | B1 | 2/2009 | Marze |
| 7,871,034 | B2 * | 1/2011 | Karem ............ 244/7 A |
| 7,900,869 | B2 * | 3/2011 | Keβler et al. ............ 244/17.13 |
| 8,774,982 | B2 * | 7/2014 | Oakley et al. ............ 701/2 |
| 8,829,699 | B2 * | 9/2014 | Egedal et al. ............ 290/44 |
| 8,979,495 | B2 * | 3/2015 | D'Anna ............ 416/114 |
| 2003/0051461 | A1 | 3/2003 | Certain |
| 2003/0094001 | A1 * | 5/2003 | Desai et al. ............ 60/791 |
| 2007/0118254 | A1 * | 5/2007 | Barnes et al. ............ 701/3 |
| 2007/0222220 | A1 * | 9/2007 | Huang et al. ............ 290/31 |
| 2008/0283671 | A1 | 11/2008 | Cherepinsky et al. |
| 2010/0225113 | A1 * | 9/2010 | Harms et al. ............ 290/44 |
| 2010/0310371 | A1 * | 12/2010 | Eglin ............ 416/1 |
| 2011/0155844 | A1 * | 6/2011 | Mak ............ 244/17.13 |
| 2011/0221194 | A1 * | 9/2011 | Egedal et al. ............ 290/44 |
| 2012/0083945 | A1 * | 4/2012 | Oakley et al. ............ 701/2 |
| 2012/0167551 | A1 * | 7/2012 | Lugg ............ 60/226.1 |
| 2013/0026759 | A1 * | 1/2013 | Krueger et al. ............ 290/44 |
| 2013/0269363 | A1 * | 10/2013 | Lu et al. ............ 60/773 |
| 2014/0123663 | A1 * | 5/2014 | Ficklscherer ............ 60/773 |

FOREIGN PATENT DOCUMENTS

| | | |
|---|---|---|
| FR | 2550161 | 2/1985 |
| FR | 2830630 | 4/2003 |
| FR | 2868561 | 10/2005 |
| FR | 2916419 | 11/2008 |
| FR | 2928192 | 9/2009 |
| WO | 9942360 | 8/1999 |
| WO | 2010143051 | 12/2010 |

OTHER PUBLICATIONS

Schaefer et al. 47th Forum American Helicopter Society 1991, p. 1293-1303, "Enhanced energy maneuverability for attack helicopters using continuous variable (C-V) rotor speed control".

Chen., NASA Technical Memorandum 103968 Sep. 1992, 45 pages, "An Exploratory Investigation of the Flight Dynamics Effects of Rotor RPM Variations and Rotor State Feedback in Hover.".

Guo., A Dissertation in Aerospace Engineering, The Pennsylvania State University The Graduate School, Dec. 2009, 121 Pages. "Flight Control Design for Rotorcraft With Variable Rotor Speed.".

Litt et al. NASA/TM 2007-214842, Jun. 2007, 18 pages, "A Sequential Shifting Algorithm for Variable Rotor Speed Control.".

* cited by examiner

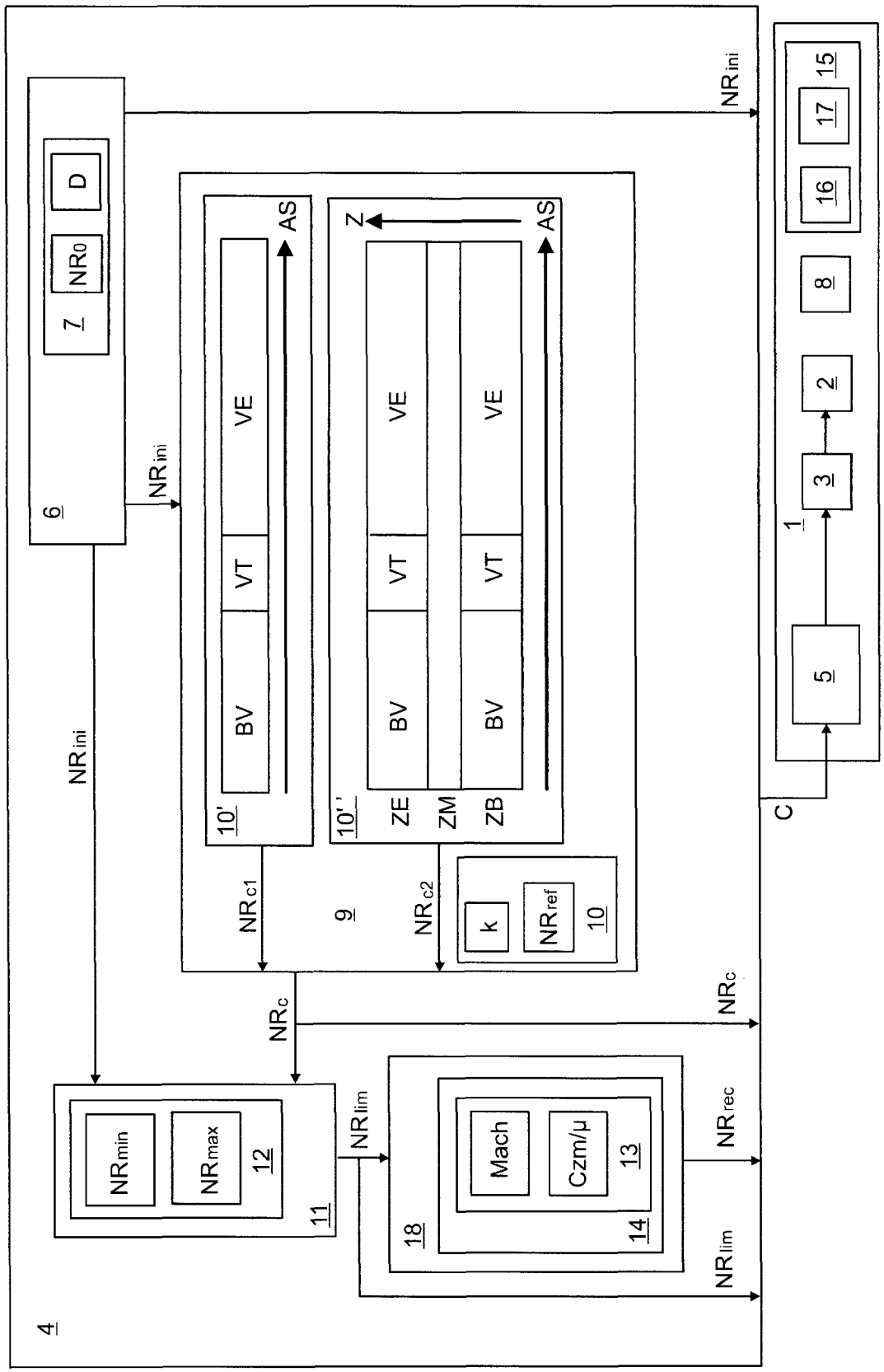

US 9,156,541 B2

METHOD OF DRIVING A MAIN ROTOR OF A ROTORCRAFT IN ROTATION IN COMPLIANCE WITH A SPEED OF ROTATION SETPOINT OF VARIABLE VALUE

CROSS REFERENCE TO RELATED APPLICATION

This application claims priority to French patent application No. FR 12 03607 filed Dec. 27, 2012, the disclosure of which is incorporated in its entirety by reference herein.

BACKGROUND OF THE INVENTION (1) Field of the Invention

The present invention relates to the field of rotorcraft fitted with at least one rotary wing rotor. The present invention relates more specifically to data processing methods and equipment adapted to a specific function of determining controlled variation in the speed at which at least one main rotor of substantially vertical axis of a rotorcraft is driven in rotation.

(2) Description of Related Art

Rotorcraft are rotary wing aircraft having at least one main rotor of substantially vertical axis that provides the rotorcraft with lift. If the rotorcraft is a helicopter, the main rotor provides not only lift, but also propulsion and/or control in pitching and in roll.

Compared with other powered aircraft, rotorcraft have the advantage of being able to hover and/or fly at low speed, including when close to the ground. As an indication, a rotorcraft is commonly said to be flying at low speeds when it is flying at less than about 50 knots (kt). Nevertheless, in cruising flight, rotorcraft are capable of flying at high speeds. As an indication, a rotorcraft is commonly said to be flying at high speed when flying at a speed lying in the range about 75 kt to 160 kt.

In this context, consideration should also be given to transitory flying speeds of the rotorcraft, i.e. flying speeds of the rotorcraft lying between low speeds and high speeds. Such transitory flying speeds of a rotorcraft are conventionally used for short periods only, between the rotorcraft flying at low speed and the rotorcraft flying at high speed.

In general, depending on the flying speed of a rotorcraft, its flight envelope is segmented into commonly accepted flying speed ranges of less than about 50 kt, transitory flying speeds, and greater than 75 kt. The values given for the ranges of rotorcraft flying speeds are given by way of indication and may be varied, in particular depending on the structure, the weight, and/or the performance of a particular rotorcraft, for example.

The lift of the rotorcraft is provided by the main rotor and it is controlled using flight controls operated by a pilot to vary the collective pitch of the blades making up the rotary wing of the main rotor. Such a pilot may be a human pilot or an autopilot. Driving rotation of the main rotor is considered as being a priority, given that it has the essential function of providing the rotorcraft with lift.

In the past, the rotary drive speed of the main rotor has long been established as being substantially constant. Nevertheless, proposals have been made to vary the drive speed of the main rotor voluntarily over a restricted range of speeds of rotation, in order to satisfy specific needs depending on various flight conditions of the rotorcraft.

For example, in order to improve the performance of a rotorcraft in a combat situation, it is known to vary the drive speed of the main rotor as a function of variation in the air speed of the rotorcraft. In this context, reference may be made to the publication "Enhanced energy maneuverability for attack helicopters using continuous variable rotor speed control" (C. G. Schaefer Jr.; F. H. Lutze Jr.); 47th Forum American Helicopter Society 1991, pp. 1293-1303.

Document US 2003/051461 (B. Certain) discloses regulating the speed of a rotorcraft engine used for driving rotors of the rotorcraft including a main rotor and a tail rotor of substantially horizontal axis, as a function of the position of the rudder control for varying the collective pitch of the blades of the tail rotor.

Nevertheless, it should be understood that multiple rotorcraft flight conditions can be taken into account in order to define a variable desired speed of rotation for the main rotor.

For example, concerning the performance of the rotorcraft, it is desirable for the pilot to have optimized ability to maneuver the rotorcraft, in particular at low flying speeds and/or in situations when the rotorcraft is close to the ground, including in the event of a possible failure of one of the rotorcraft engines used for driving rotation of the main rotor.

Also by way of example, it is also useful to take account of the noise produced by the rotorcraft in order to limit the sound nuisance that it generates while approaching or departing from a landing point.

In this context, reference may be made to Document U.S. Pat. No. 6,198,991 (Yamakawa et al.), which proposes reducing the sound nuisance generated by a rotorcraft approaching a landing point. In one possible implementation, it is proposed for that purpose to vary the speed of rotation of a main rotor of the rotorcraft in order to reduce the noise produced by the rotorcraft.

Also by way of example, reference may be made to Document WO 99/42360 (A. E. Karem), which proposes improving the performance obtained by a main rotor of a rotorcraft by causing its drive speed to vary depending on a load threshold supported by the blades of the main rotor.

Also by way of example, concerning the ambient outside medium in which the rotorcraft is flying, the physicochemical characteristics of the air have an influence on the lift of the rotorcraft for a given angle of incidence of the blades of the main rotor. The rotorcraft has various measuring and/or calculation instruments serving to identify the values of various parameters, such as the height of the rotorcraft above the ground, its pressure altitude, its density altitude, or the outside temperature, for example. On the basis of identifying the ambient outside medium or the flying speed of the rotorcraft, actions may be taken to modify the speed at which the main rotor is driven in rotation.

In this context, reference may be made to Document US 2007/118254 (G. W. Barnes, et al.), which proposes varying the speed of rotation of a main rotor of a rotorcraft depending on two values considered as being low and high under predefined threshold conditions for values of various parameters associated with previously-identified flight conditions of the rotorcraft.

Reference may also be made in this context to Document WO 2010/143051 (Agusta Spa et al.), which proposes varying the speed of rotation of a main rotor of a rotorcraft in compliance with a previously-established map depending on various flight conditions of the rotorcraft.

BRIEF SUMMARY OF THE INVENTION

In this context, the approach of the present invention lies in using the available facility for easily modifying the speed of rotation of at least one main rotor of a rotorcraft, and seeking to optimize it depending on specific flight conditions of the rotorcraft, which conditions are potentially very diverse.

At its most general, the present invention seeks to provide a method of driving rotation of at least one main rotor while performing a method of determining a variable value for a regulation setpoint concerning the operation of a power plant for driving rotation of the main rotor. Said regulation setpoint relates in particular to a desired speed of rotation for driving the main rotor in rotation.

The present invention seeks more particularly to be able to modify the speed of rotation of the main rotor easily depending on techniques applicable to all kinds of rotorcraft of a variety of respective structures and depending on various criteria relating to the flight conditions of the rotorcraft suitable for being taken into account in isolation or in combination.

The method of the present invention is a method of driving rotation of at least one main rotor of substantially vertical axis of a rotorcraft by a power plant of the rotorcraft.

The method comprises at least one operation of a control unit applying a method of determining the value of a regulation setpoint relating to a speed for driving said at least one main rotor in rotation. Said method determines the value of the regulation setpoint at least depending on the value of a physicochemical parameter of the ambient air outside the rotorcraft.

The method also comprises at least one operation of transmitting the previously-determined value of the regulation setpoint to a regulator unit for regulating the operation of the power plant. The regulator unit causes said at least one main rotor to be driven in compliance with the transmitted value for the regulation setpoint.

According to the present invention, said method is mainly recognizable in that the value of the regulation setpoint is determined at least by applying a calculation rule. The calculation rule continuously generates progressive and continuous variation of a value for an initial setpoint from which the regulation setpoint is determined. The progressive and continuous variation in the value of the initial setpoint is calculated depending on progressive and continuous variation in the value of the density of the ambient air outside the rotorcraft.

It should be considered that the concept of variation that is "continuous" may be applied equally well to analog variation or to digital variation applied to data sequences that are as short as possible.

By means of these provisions, the value of the initial setpoint is varied continuously by applying the calculation rule incorporating a calculation parameter relating to the density of the ambient air outside the rotorcraft. Varying the value of the calculation parameter varies the value of the initial setpoint as calculated by applying the calculation rule. Where appropriate, the value of the initial setpoint is easily modifiable regardless of the previously-identified specific flight conditions of the rotorcraft.

More particularly, an initial setpoint value obtained by applying the calculation rule is easily modified by secondary calculation rules specific to previously-identified specific flight conditions of the rotorcraft. Such flight conditions are identified by taking account of predefined respective modification criteria serving to modify, depending on needs, the value of the initial setpoint, and possibly also the value of a calculated setpoint derived from the initial setpoint and of value that is modified by applying at least one secondary calculation rule.

Said secondary calculation rules may advantageously:

be taken into consideration in isolation or in combination;

incorporate the calculation rule individually or collectively at least in pairs; and be applied individually or collectively at least in pairs equally well to the initial setpoint or to a calculated setpoint.

Furthermore, a said secondary calculation rules is potentially and for example:

a correction rule for modifying either the value of the initial setpoint or the value of a calculated setpoint;

a limiting rule for limiting either the value of the initial setpoint or the value of a calculated setpoint, depending on at least one previously-defined acceptable value threshold; and/or a restriction rule for restricting variation in the regulation setpoint by modifying either the value of the initial setpoint, or the value of a calculated setpoint, or the value of a limited setpoint as obtained by applying the limiting rule.

More particularly, there is proposed a said rule for calculating the value of the initial setpoint in compliance with the following formulation $$NR_{ini}^2 \cdot \sigma = NR_0^2$$

in which:

$NR_{ini}$ is the initial setpoint value;

$\sigma$ is the current density of the ambient air outside the rotorcraft; and $NR_0$ is a constant value relating to a predefined speed for driving the main rotor. In particular, said predefined speed may be considered as depending on the density of the ambient outside air and assuming an atmospheric pressure of 1013.25 hectopascals (hPa) and a temperature of 15° C.

It should be considered that said constant value $NR_0$ may advantageously be selected in compliance with various predefined speeds of respective values by selectively taking account of one or more of said modification criteria for modifying at least the value of the initial setpoint and possibly also the value of a calculated setpoint.

In accordance with the present invention, the value of the regulation setpoint that is transmitted to the regulation unit is potentially the value of the initial setpoint.

In an advantageous implementation, said method comprises at least one operation of calculating the value of at least one calculated setpoint. The value of said calculated setpoint is derived from the value of the initial setpoint as modified by applying at least one correction criterion relating, for example, at least to the flying speed of the rotorcraft and possibly also to the flying altitude of the rotorcraft. The flying altitude of the rotorcraft may be evaluated equally well by measuring its pressure altitude and/or its height above the ground, for example.

By way of example, the value of the calculated setpoint is advantageously defined by applying a correction rule in compliance with the following formulation:

$$NR_c = NR_{ref} + k \cdot (NR_{ini} - NR_{ref})$$

in which correction rule:

$NR_c$ is the value of the calculated setpoint obtained by applying the correction rule;

$NR_{ref}$ is a predefined reference speed for driving the main rotor in rotation;

$k$ is a constant limiting coefficient of value lying in the range 0.3 to 1 inclusive; and $NR_{ini}$ is the value of the initial setpoint.

According to this correction rule the value of $NR_{ref}$ and the value of $k$ are predefined at least for previously-established ranges of flying speeds of the rotorcraft, comprising respectively at least low speeds less than 50 kt ±10% and high speeds greater than 70 kt ±10%, and possibly at least for previously-established flying altitude ranges of the rotorcraft.

It can be seen that such a correction rule can potentially and advantageously be incorporated in the rule for calculating the value of the initial setpoint.

As mentioned above, the values mentioned for flying speeds of the rotorcraft are given by way of indication and they can vary, in particular depending on the specific structure of the rotorcraft, depending on its weight including potentially taking account of its current weight, and/or depending on the performance of its equipment, its main rotor in particular.

In an implementation, a value for a first calculated setpoint is generated by applying a correction criterion relating to the flying speed of the rotorcraft.

For example, at low flying speeds of the rotorcraft, the value of the reference speed and the value of the limiting coefficient are predefined in compliance with a value for a first calculated setpoint that is potentially greater than the value of the initial setpoint.

Such provisions serve to enhance the performance of the main rotor while the rotorcraft is flying at low speeds and independently of any account being taken of the flying altitude of the rotorcraft.

Also by way of example, for the rotorcraft flying at high speeds, the value of the reference speed and the value of the limiting coefficient are predefined in compliance with a value for the first calculated setpoint defined as being equal to the value of the initial setpoint.

Such provisions make it possible to obtain optimized performance of the rotorcraft while improving acoustic performance of the rotorcraft by limiting the noise it produces.

It can be seen that depending on the structure of the rotorcraft and depending on needs, various values may be given to $NR_{ref}$, to $\underline{k}$, and to $NR_0$ for executing said correction rule. This serves to illustrate an advantage of the present invention, whereby the proposed provisions make it easy for specific values of predefined calculation parameters included in the calculation rule and/or in at least one correction rule to be taken into account in modular manner depending on the structure of the rotorcraft and depending on needs. Such modularity relates in particular to allocating specific predefined values to the calculation parameters, such as the said calculation parameters defined $NR_{ref}$, $\underline{k}$, and $NR_0$, depending on the structure of the rotorcraft and/or depending on the correction criterion (or criteria) for the value of the initial setpoint or for a calculated setpoint that is taken into account.

By way of illustration and in an implementation, it is possible, both at low and at high flying speeds of the rotorcraft, to take into consideration a value $NR_{ref}$ that is common to these flying speed ranges of the rotorcraft, while also taking into consideration respective values for $\underline{k}$ and respective values for $NR_0$ in each of said ranges of flying speeds of the rotorcraft.

In an implementation, for transitory flying speeds of the rotorcraft lying between the low speeds and the high speeds, the value of a first calculated setpoint is defined by correcting the value of the initial setpoint by continuously varying between the value of the first calculated setpoint as defined for low speeds and the value of the first calculated setpoint as defined for high speeds.

Such provisions make it possible to avoid the value of the regulation setpoint varying quickly towards predefined values for acceptable threshold speeds for driving rotation of the main rotor, and in particular a maximum limiting speed and a minimum limiting speed.

In accordance with the present invention, the value of the regulation setpoint as transmitted to the regulator unit is potentially the value of the first calculated setpoint.

In another implementation, the value of a second calculated setpoint is generated by applying a correction criterion relating to the rotorcraft flying at high speeds for previously-established ranges of altitudes of the rotorcraft, respectively a range of low altitudes less than 250 meters (m) ±20%, and a range of higher altitudes greater than 650 m ±20%.

In particular, it is desired to reduce the sound nuisance generated by the rotorcraft while approaching a landing point, and in particular a heliport. For the rotorcraft flying at high speeds, the value of the second setpoint calculated is defined for this purpose, e.g. as follows:

at low altitudes, the value of the second calculated setpoint is defined by decreasing the value of the initial setpoint by a constant value lying in the range 3% to 10% of the value of the predefined setpoint of the calculation rule;

at high altitudes, the value of the second calculated setpoint is equally well defined as being equal to the value of the initial setpoint, or to the value of the first calculated setpoint; and at moderate altitudes lying between the low altitudes and the high altitudes, the value of the second calculated setpoint is defined by continuous variation between the value of the second calculated setpoint as defined for low altitudes and the value of the second calculated setpoint as defined for high altitudes.

In compliance with such provisions for calculating the value of the second calculated setpoint, it should be considered that taking account of said reference speed corresponds to taking account of said predefined speed, the value of the reference speed $NR_{ref}$ then being the value of the predefined speed.

The value of the second calculated setpoint as defined for low altitudes may for example be no greater than or less than a minimum predefined speed for driving the main rotor in rotation.

It should be observed that the above-mentioned values for height above the ground are given by way of indication, where the concept of low altitude, moderate altitude, and high altitude should be assessed depending on practice in the field of rotorcraft. Furthermore, the concept of height above the ground should be assessed depending on a flying altitude of the rotorcraft, regardless of the parameters used for evaluating such a flying altitude, such as pressure altitude, or height above the ground itself.

In accordance with the present invention, the value of the regulation setpoint transmitted to the regulator unit is potentially the value of the second calculated setpoint.

Consideration should be given to a source of nuisance that is induced by the stresses to which the rotor(s) of the rotorcraft are subjected on being driven in rotation, and in particular at high flying speeds of the rotorcraft. Such stresses that are considered as being excessive at a given stress threshold are potentially caused by the blades of the main rotor moving at a critical speed. It is consequently proposed that the stresses to which the blades of the main rotor are subjected should be taken into consideration when calculating the value for the regulation setpoint.

To this end, and in a preferred implementation, prior to transmitting the value of the regulation setpoint to the regulator unit, the method comprises an operation of limiting the value of the regulation setpoint to within a predefined range of acceptable speeds depending on a nominal speed for driving the main rotor. Said range of acceptable speeds is predefined as lying between a maximum limiting speed of 105% ±3% of the nominal speed and a minimum limiting speed of 92% ±3% of the nominal speed.

In a particular implementation, it should be observed that said predefined maximum speed is the maximum limiting speed and said predefined minimum speed is the minimum limiting speed.

Said limiting operation potentially comprises an operation of modifying the value of the maximum limiting speed and/or the value of the minimum limiting speed, depending on the stresses to which the blades of the main rotor are subjected.

In an implementation, the maximum limiting speed is reduced to ensure that the tips of the blades of the main rotor do not exceed an acceptable predefined Mach number.

More particularly, and considering the rotorcraft flying at low speeds less than 50 kt ±10%, the acceptable predefined Mach number for the tips of the blades of the main rotor lies in the range 0.70 to 0.80.

Still more particularly, and considering the rotorcraft flying at high speeds greater than 70 kt ±10%, the predefined acceptable Mach number at the tips of the blades of the main rotor lies in the range 0.90 to 0.95.

In another implementation, the limiting minimum speed is increased to ensure that the mean lift coefficient of the blades of the main rotor at a given advance ratio of the main rotor does not exceed a maximum acceptable value.

For this purpose, account is taken in particular of a potentially linear function defining the values of a restriction criterion depending on the respective values of the mean lift coefficient of the blades of the main rotor and the advance ratio of the main rotor.

It should be observed that for certain flight conditions of the rotorcraft that are considered as being extreme within the flight envelope of a rotorcraft of given structure, a conflict may arise between the value of the minimum limiting speed as increased and the value of the maximum limiting rotation as decreased. More particularly, under such extreme flight conditions, the value of the minimum limiting speed as increased may tend to become greater than the value of the maximum limiting speed as decreased.

For example, at high altitudes and at low temperatures less than about −18° C., the value of the minimum limiting speed as increased tends to become greater than the value of the maximum limiting speed as decreased. Under such circumstances, it is preferable to take account of the value of the minimum limiting speed in order to determine the value of the regulation setpoint, to the detriment of the value of the minimum limiting speed as increased, in order to enhance the maneuverability of the rotorcraft.

That is why the method preferably includes an operation of comparing the value of the maximum limiting speed as decreased with the value of the minimum limiting speed as increased. Depending on previously-identified extreme flight conditions, the comparison operation generates an order to select a value that is used for determining the value of the regulation setpoint, selected from the greatest value or conversely the smallest value of one or the other of the limiting speed values that have been compared.

The value of the regulation setpoint transmitted to the regulator unit is potentially the value either of the maximum limiting speed or of the minimum limiting speed in compliance with limiting the value of the regulation setpoint to within said range of acceptable speeds.

Whatever the technique used for varying the value of the regulation setpoint that is transmitted to the regulator unit, it is desirable for this variation always to be limited prior to being transmitted. These provisions make it easier to regulate the operation of the engine(s) of the rotorcraft used for driving the main rotor in rotation.

For this purpose, and in a preferred implementation, prior to transmitting the value of the regulation setpoint to the regulator unit, the method comprises a restriction operation limiting variation per second of the value of the regulation setpoint to within 0.5% to 2% of the value of the regulation setpoint.

The value of the regulation setpoint transmitted to the regulator unit is potentially the value of a restricted setpoint obtained by executing the restriction operation.

Furthermore, the method preferably comprises an operation of displaying at least first information relating to the measured drive speed of the main rotor, and second information relating to the value of the regulation setpoint transmitted to the regulator unit. Such a display operation enables the rotorcraft pilot to assess the pertinence of a variation in the speed at which the main rotor is driven in rotation.

BRIEF DESCRIPTION OF THE SEVERAL VIEWS OF THE DRAWINGS

An implementation of the present invention is described below with reference to the sole FIGURE of the accompanying sheet, said sole FIGURE being a block diagram showing a preferred implementation of a method in accordance with the present invention.

DETAILED DESCRIPTION OF THE INVENTION

In the sole FIGURE, a rotorcraft 1 has at least one main rotor 2 of axis that is substantially vertical providing the rotorcraft at least with lift, and possibly also with propulsion and with flight control if the rotorcraft is a helicopter. The main rotor 2 is driven in rotation by a power plant 3 having at least one engine, a turboshaft engine in particular.

It is desired to cause the speed at which the main rotor 2 is driven to be varied depending on various flight conditions of the rotorcraft 1. The looked-for variation in the drive speed in rotation of the main rotor 2 is controlled by taking account of various criteria representative of the flight conditions of the rotorcraft 1.

For this purpose the rotorcraft 1 is fitted with a control unit 4 for generating the value for a regulation setpoint C that is transmitted to a regulator unit 5 for regulating the operation of the power plant 3.

Said regulation setpoint C relates in particular to setting a speed at which the main rotor 2 is to be driven in rotation, the value of the regulation setpoint C being determined by applying a calculation method that potentially comprises one or more calculation operations in succession.

In accordance with the application of this method, an operation 6 of determining the value of an initial setpoint $NR_{ini}$ by calculation is performed by applying a calculation rule 7 incorporating various initial calculation parameters. The calculation rule 7 takes account of a first initial parameter relating to the density D of the ambient outside air, such that continuous variation in said current density D as determined by instrumentation 8 on board the rotorcraft 1 gives rise to continuous variation in the value of the initial setpoint $NR_{ini}$.

In a specific formulation of the calculation rule 7, account is taken at least of a second initial parameter relating to a predefined speed $NR_0$ for driving the main rotor 2 taking into consideration the density of the ambient outside air and assuming an atmospheric pressure of 1013.25 hPa and at a temperature of 15° C. The value of the predefined speed $NR_0$ is a constant that is taken into account by the calculation rule 7.

It should nevertheless be observed that said constant value is potentially taken into consideration depending on given flight conditions of the rotorcraft 1, said constant value advantageously being established depending on respective values for different predefined flight conditions of the rotorcraft 1.

Where appropriate, it is possible to perform a correction operation 9 by calculating the value for the initial setpoint $NR_{ini}$ depending on predetermined specific flight conditions. The operation 9 of correction by calculation is potentially performed by applying a correction rule 10 by calculating the value of the initial setpoint $NR_{ini}$. For this purpose, said correction rule incorporates at least one correction criterion 10' or 10".

It should be considered that the correction rule 10 potentially and advantageously incorporates the calculation rule 7. The application of the correction rule 10 potentially generates either the value of the initial setpoint $NR_{ini}$, or else the value of a calculated setpoint $NR_c$, by taking account of correction criteria incorporated in the correction rule 10. The respective values of the correction criteria are predefined depending on given flight conditions of the rotorcraft.

Such correction criteria relate in particular to a limiting coefficient $\underline{k}$ and to a predefined reference speed $NR_{ref}$ for driving the main rotor 1 in rotation.

The value of the calculated setpoint $NR_c$ may for example be the value of a first calculated setpoint $NR_{c1}$ prepared by taking account solely of the flying speed AS of the rotorcraft 1.

Commonly accepted ranges of flying speeds AS for the aircraft 1 are identified, and in particular a range BV of low flying speeds for the rotorcraft 1 up to about 50 kt, a range VT of transitory flying speeds for the rotorcraft 1, lying between the low speeds BV and high flying speeds VE for the rotorcraft 1 that are faster than about 70 kt. The respective values of the first calculated setpoint $NR_{c1}$ are generated selectively for each of said ranges of flying speeds for the rotorcraft.

Also by way of example, the calculated setpoint $NR_c$ may be a second calculated setpoint $NR_{c2}$ of value that is prepared by taking account of the flying speed AS of the rotorcraft 1 and the altitude Z at which the rotorcraft 1 is flying as evaluated by the on-board instrumentation 8 of the rotorcraft 1. By way of example, the flying altitude Z of the rotorcraft 1 is evaluated by measuring the height of the rotorcraft above the ground or by measuring a pressure altitude.

Commonly accepted ranges of altitudes Z for the rotorcraft 1 are identified, in particular a low altitude range ZB up to about 250 m, a moderate altitude range ZM lying between low altitudes BA and high altitudes ZE, and a range of so-called high altitudes ZE greater than about 650 m. Such altitude range values are mentioned by way of indication, and should be assessed depending on practice in the field of aviation.

Respective values for the second calculated setpoint $NR_{c2}$ are generated selectively for each combination of said ranges of flying speed AS and said ranges of altitude Z of the rotorcraft.

Advantageously, an operation 11 of limiting the value of the regulation setpoint C is performed prior to transmitting it to the regulator unit 5. Executing the limiting operation 11 generates a limited setpoint value $NR_{lim}$ in application of a limiting rule 12 for limiting the value of the initial setpoint $NR_{ini}$ or the value of a calculated setpoint $NR_c$ to limiting speed values. For this purpose, a range of acceptable speeds for driving the main rotor 2 in rotation is predefined between a maximum limiting speed $NR_{max}$ and a minimum limiting speed $NR_{min}$. The value of the initial setpoint $NR_{ini}$ or the value of a calculated setpoint $NR_c$ is limited to within said range of acceptable speeds.

The limiting operation may also advantageously take account of at least one limiting criterion 13 relating to constraints to which the blades of the main rotor 2 are subjected. Such limiting criteria relate in particular to ensuring that the tips of the blades of the main rotor 2 do not exceed a predefined Mach number (Mach) or preventing the mean lift coefficient of the blades of the main rotor exceeding an acceptable maximum value for a given advance ratio of the main rotor 2 (Czm/μ).

Account is also taken of an operation 18 for restricting variation in the value of the regulation setpoint C prior to the setpoint being transmitted to the regulator unit 5. The restriction operation 18 generates a restricted setpoint value $NR_{rec}$, by applying a restriction rule 14 that modifies the values of said limiting speeds, which may be the maximum limiting speed $NR_{max}$ or the minimum limiting speed $NR_{min}$ depending on the restriction criterion 13 that is taken into account.

It should be considered that the value of the regulation setpoint C that is transmitted to the regulator unit may potentially be the value of said initial setpoint $NR_{ini}$, the value of a said calculated setpoint $NR_c$, the value of a said limiting setpoint $NR_{lim}$, or the value of a said restricted setpoint $NR_{rec}$.

Furthermore, the control unit 4 is in communication with display means 15 of the rotorcraft 1. The method includes a display operation using the display means 15 to provide the pilot of the rotorcraft 1 with first information 16 relating to the speed at which the main rotor 2 is being driven as measured by the on-board instrumentation 8 of the rotorcraft 1, and second information relating to the value of the regulation setpoint C as transmitted to the regulator unit 5.

What is claimed is:

1. A method of operating a rotorcraft having at least one main rotor of substantially vertical axis, a power plant configured to drive the at least one main rotor, and a regulator unit configured to regulate operation of the power plant, said method comprising:
   determining, by a control unit of the rotorcraft, the value of a regulation setpoint (C) relating to a speed for driving said at least one main rotor in rotation, the value of the regulation setpoint (C) at least depending on the value of a physicochemical parameter of the ambient air outside the rotorcraft;
   wherein determining the value of the regulation setpoint (C) includes at least applying a calculation rule that continuously generates progressive and continuous variation of a value for an initial setpoint ($NR_{ini}$) from which the regulation setpoint (C) is determined, the progressive and continuous variation in the value of the initial setpoint ($NR_{ini}$) being calculated depending on progressive and continuous variation in the value of the density of the ambient air outside the rotorcraft;
   transmitting the value of the regulation setpoint (C) from the control unit to a regulator unit; and
   driving the at least one main rotor to rotate in compliance with the value of the regulation setpoint (C) by regulating, by the regulator unit, the operation of the power plant to cause the at least one main rotor to be driven in compliance with the value of the regulation setpoint (C).

2. The method according to claim 1, wherein the calculation rule complies with the following formulation:

$$NR_{ini}^2 \cdot \sigma = NR_0^2$$

in which:
NR$_{ini}$ is the initial setpoint value;
σ is the current density of the ambient air outside the rotorcraft; and
NR$_0$ is a constant value relating to a predefined speed for driving the main rotor depending on the density of the ambient outside air and assuming an atmospheric pressure of 1013.25 hectopascals (hPa) and a temperature of 15° C.

3. The method according to claim 1, wherein the value of the regulation setpoint (C) that is transmitted to the regulation unit is the value of the initial setpoint (NR$_{ini}$).

4. The method according to claim 1 further comprising at least one operation of calculating the value of at least one calculated setpoint (NR$_c$), the value of said calculated setpoint (NR$_c$ being derived from the value of the initial setpoint (NR$_{ini}$) as modified by applying at least one correction criterion relating at least to the flying speed (AS) of the rotorcraft.

5. The method according to claim 4, wherein the value of the calculated setpoint (NR$_c$) is defined by applying a correction rule in compliance with the following formulation:

$$NR_c = NR_{ref} = k \cdot (NR_{ini} - NR_{ref})$$

in which correction rule:
NR$_c$ is the value of the calculated setpoint (NR$_c$) obtained by applying the correction rule;
NR$_{ref}$ is a predefined reference speed for driving the main rotor in rotation;
k is a constant limiting coefficient of value lying in the range 0.3 to 1 inclusive; and
NR$_{ini}$ is the value of the initial setpoint (NR$_{ini}$); and
wherein the rules for correcting the value of NR$_{ref}$ and the value of k are predefined at least for previously-established ranges of flying speed of the rotorcraft, including respectively at least low speeds (BV) less than 50 knots (kt)±10% and high speeds (VE) greater than 70 knots (kt)±10%.

6. The method according to claim 5, wherein a value for a first calculated setpoint (NR$_{c1}$) is generated by applying a correction criterion relating to the flying speed (AS) of the rotorcraft.

7. The method according to claim 6, wherein, for the rotorcraft flying at high speeds (VE), the value of the reference speed (NR$_{ref}$) and the value of the limiting coefficient (k) are predefined in compliance with a value for the first calculated setpoint (NR$_{c1}$) defined as being equal to the value of the initial setpoint (NR$_{ini}$).

8. The method according to claim 6, wherein, for transitory flying speeds (VT) of the rotorcraft lying between the low speeds (BV) and the high speeds (VE), the value of a first calculated setpoint (NR$_{c1}$) is defined by correcting the value of the initial setpoint (NR$_{ini}$) by continuously varying between the value of the first calculated setpoint (NR$_{c1}$) as defined for low speeds (BV) and the value of the first calculated setpoint (NR$_{c1}$) as defined for high speeds (VE).

9. The method according to claim 6, wherein the value of the regulation setpoint (C) as transmitted to the regulator unit is the value of the first calculated setpoint (NR$_{c1}$).

10. The method according to claim 4, wherein the value of a second calculated setpoint (NR$_{c2}$) is generated by applying a correction criterion relating to the rotorcraft flying at high speeds (VE) for previously-established ranges of altitudes (Z) of the rotorcraft, respectively a range of low altitudes (ZB) less than 250 meters (m)±20%, and a range of higher altitudes (ZE) greater than 650 meters (m)±20%.

11. The method according to claim 10, wherein for the rotorcraft flying at high speeds (VE), the value of the second calculated setpoint (NR$_{c2}$) is defined as follows:
at low altitudes (ZB), the value of the second calculated setpoint (NR$_{c2}$) is defined by decreasing the value of the initial setpoint (NR$_{ini}$) by a constant value lying in the range 3% to 10% of the value of the predefined setpoint (NR$_0$) of the calculation rule;
at high altitudes (ZE), the value of the second calculated setpoint (NR$_{c2}$) is equally well defined as being equal to the value of the initial setpoint (NR$_{ini}$), or to the value of the first calculated setpoint (NR$_{c1}$); and
at moderate altitudes (ZM) lying between the low altitudes (ZB) and the high altitudes (ZE), the value of the second calculated setpoint (NR$_{c2}$) is defined by continuous variation between the value of the second calculated setpoint (NR$_{c2}$) as defined for low altitudes (ZB) and the value of the second calculated setpoint (NR$_{c2}$) as defined for high altitudes (ZE).

12. The method according to claim 10, wherein the value of the regulation setpoint (C) transmitted to the regulator unit is the value of the second calculated setpoint (NR$_{c2}$).

13. The method according to claim 1, wherein, prior to transmitting the value of the regulation setpoint (C) to the regulator unit, the method further comprises an operation of limiting the value of the regulation setpoint (C) to within a predefined range of acceptable speeds depending on a nominal speed for driving the main rotor, lying between a maximum limiting speed (NR$_{max}$) of 105%±3% of the nominal speed and a minimum limiting speed (NR$_{min}$) of 92%±3% of the nominal speed.

14. The method according to claim 13, wherein the maximum limiting speed (NR$_{max}$) is reduced to ensure that the tips of the blades of the main rotor do not exceed an acceptable predefined Mach number.

15. The method according to claim 14, wherein for the rotorcraft flying at low speeds (BV) less than 50 knots (kt) ±10%, the acceptable predefined Mach number for the tips of the blades of the main rotor lies in the range 0.70 to 0.80, and wherein for the rotorcraft flying at high speeds (VE) greater than 70 knots (kt)±10%, the predefined acceptable Mach number at the tips of the blades of the main rotor lies in the range 0.90 to 0.95.

16. The method according to claim 13, wherein the limiting minimum speed (NR$_{min}$) is increased to ensure that the mean lift coefficient of the blades of the main rotor at a given advance ratio of the main rotor does not exceed a maximum acceptable value.

17. The method according to claim 13, wherein the value of the regulation setpoint (C) transmitted to the regulator unit is the value either of the maximum limiting speed (NR$_{max}$) or of the minimum limiting speed (NR$_{min}$) in compliance with limiting the value of the regulation setpoint (C) to within said range of acceptable speeds.

18. The method according to claim 1, wherein, prior to transmitting the value of the regulation setpoint (C) to the regulator unit, the method further comprises a restriction operation limiting variation per second of the value of the regulation setpoint (C) to within 0.5% to 2% of the value of the regulation setpoint (C);
wherein the value of the regulation setpoint (C) transmitted to the regulator unit is the value of a restricted setpoint (NR$_{rec}$) obtained by executing the restriction operation.

19. The method according to claim 1, further comprising an operation of displaying at least first information relating to the measured drive speed of the main rotor, and second information relating to the value of the regulation setpoint (C) transmitted to the regulator unit.

20. A rotorcraft comprising:
  a main rotor of substantially vertical axis;
  a control unit configured to determine the value of a regulation setpoint (C) relating to a speed for driving the main rotor in rotation, the value of the regulation setpoint (C) at least depending on the value of a physicochemical parameter of the ambient air outside the rotorcraft;
  wherein the control unit determines the value of the regulation setpoint (C) by at least applying a calculation rule that continuously generates progressive and continuous variation of a value for an initial setpoint ($NR_{ini}$) from which the regulation setpoint (C) is determined, the progressive and continuous variation in the value of the initial setpoint ($NR_{ini}$) being calculated depending on progressive and continuous variation in the value of the density of the ambient air outside the rotorcraft; and
  a power plant configured to drive the main rotor, wherein the power drives the main rotor to rotate in compliance with the value of the regulation setpoint (C).

* * * * *